(12) United States Patent
Kinoshita

(10) Patent No.: US 6,508,474 B2
(45) Date of Patent: Jan. 21, 2003

(54) METAL GASKET WITH BEAD AND SEAL COATING

(75) Inventor: Yuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/904,654

(22) Filed: Jul. 16, 2001

(65) Prior Publication Data

US 2002/0014746 A1 Feb. 7, 2002

(30) Foreign Application Priority Data

Jul. 27, 2000 (JP) ........................................ 2000-227101

(51) Int. Cl.$^7$ ................................................ F02F 11/00
(52) U.S. Cl. ........................ 277/592; 277/594; 277/596
(58) Field of Search ............................. 277/592, 594–6

(56) References Cited

U.S. PATENT DOCUMENTS

| | | | | |
|---|---|---|---|---|
| 494,402 | A | * | 3/1893 | Walsh |
| 3,930,656 | A | * | 1/1976 | Jelinek |
| 4,140,323 | A | * | 2/1979 | Jacobs |
| 4,155,561 | A | * | 5/1979 | Rudy et al. |
| 4,397,472 | A | * | 8/1983 | Czernik |
| 4,428,593 | A | * | 1/1984 | Pearlstein |
| 4,462,615 | A | * | 7/1984 | Ulmer et al. |
| 4,635,949 | A | * | 1/1987 | Lucas et al. |
| 4,830,698 | A | * | 5/1989 | DeCore et al. |
| 5,340,525 | A | * | 8/1994 | Czernik |
| 5,700,015 | A | * | 12/1997 | Tensor |
| 5,713,580 | A | * | 2/1998 | Ueta |
| 5,938,246 | A | * | 8/1999 | Wallace et al. ............. 285/351 |
| 5,951,021 | A | * | 9/1999 | Ueta ........................... 277/593 |
| 6,105,971 | A | * | 8/2000 | Hasegawa ................... 277/593 |
| 6,145,847 | A | * | 11/2000 | Maeda et al. ............... 277/593 |
| 6,186,506 | B1 | * | 2/2001 | Kionoshita .................. 277/313 |
| 6,343,795 | B1 | * | 2/2002 | Zerfass et al. .............. 277/593 |
| 6,371,489 | B1 | * | 4/2002 | Combet et al. ............. 277/594 |
| 6,390,479 | B1 | * | 5/2002 | Combet et al. ............. 277/594 |

* cited by examiner

Primary Examiner—Anthony Knight
Assistant Examiner—Alison K. Pickard
(74) Attorney, Agent, or Firm—Kaensaka & Takeuchi

(57) ABSTRACT

A metal gasket for an internal combustion engine is formed of at least one metal plate extending substantially throughout an entire area to be sealed. The metal plate includes a hole to be sealed, and a bead projecting outwardly from the metal plate to surround the hole. A concave is formed inside the bead to extend inwardly from an outer surface of the metal plate. A sealing material is disposed in the concave to project outwardly from the outer surface of the metal plate. Thus, even if a foreign material is disposed on the bead, the sealing ability of the gasket is not substantially affected.

5 Claims, 2 Drawing Sheets

METAL GASKET WITH BEAD AND SEAL COATING

BACKGROUND OF THE INVENTION AND RELATED ART STATEMENT

The present invention relates to a metal gasket, more particularly, a metal cylinder head gasket to be installed between a cylinder head and a cylinder block of the internal combustion engine.

Conventionally, as a cylinder head gasket to be installed between a cylinder head and a cylinder block, a metal gasket formed of one or a plurality of metal plates has been widely used.

In the conventional gasket, as a number of metal plates for constituting the gasket is reduced, it has been known and pointed out that a reduction of a sealing ability occurs due to a foreign material. Namely, when a gasket is installed between a cylinder head and a cylinder block, a foreign material, such as cutting chips of metals in forming the cylinder head and the cylinder block, may be interposed between the gasket and the cylinder head and/or between the gasket and the cylinder block. If the foreign material is not caught or deposited on a bead of the gasket, the sealing ability is not reduced. However, if the foreign material is deposited on the bead of the gasket, when the absorbing ability of the bead for the foreign material is small due to the reduction of the number of the metal plates for the gasket, the sealing ability of the gasket is affected or reduced.

The present invention has been made in view of the above, and an object of the invention is to provide a metal gasket, wherein even if a foreign material is disposed on a bead between a cylinder head and a cylinder block, a sealing ability at a bead of the gasket is not reduced by the foreign material.

Another object of the invention is to provide a metal gasket as stated above, wherein the gasket can be formed of one or a plurality of metal plates.

Further objects and advantages of the invention will be apparent from the following description of the invention.

SUMMARY OF THE INVENTION

A metal gasket for an internal combustion engine of the invention is formed of a first metal plate extending substantially throughout an entire area to be sealed. The first metal plate includes a first hole corresponding to a hole of the engine to be sealed, and a first bead projecting outwardly from the first metal plate to surround the first hole. The first bead has a concave formed inside the first bead and extends inwardly from an outer surface of the first metal plate. In the invention, a sealing material is disposed in the concave to project outwardly from the outer surface of the first metal plate.

In the gasket of the invention, the gasket is disposed such that the concave formed by the bead and having the sealing material therein faces the cylinder head or cylinder block where the foreign material is likely to adhere. In case the foreign material, such as metal chip, is not caught or deposited on the bead, the sealing ability of the bead or the gasket is not lowered at all.

Even if the foreign material is caught or deposited on the bead, the sealing ability of the bead or gasket is not lowered. In particular, in case the foreign material is oriented along the bead, the foreign material is pushed into the concave of the bead, so that the foreign material does not affect the sealing ability of the bead.

In case the foreign material is oriented across the bead, the foreign material is pushed between the cylinder head and the cylinder block when the gasket is installed. Thus, the foreign material is flattened and pushed into the sealing material to thereby be covered by the sealing material. Therefore, the reduction of the sealing ability in the gasket due to the foreign material is prevented.

As stated above, since the sealing material is disposed in the concave of the bead, even if a foreign material, such as metal chip, is held between the bead of the gasket and the cylinder head or cylinder block, the reduction of the sealing ability due to the foreign material deposited on the bead is prevented.

The sealing material may be a foamed sealing material or paint, which includes an inside portion disposed in the concave and an outside portion located outside the concave projecting outwardly from the outer surface of the metal plate. The outside portion of the sealing material has a length extending over the width of the concave in a width direction of the bead, which is equal to or less than 2 mm. Also, a ratio of the sealing material at the inside portion and the outside portion is 3:1 to 1:1.

The metal gasket may further include a second metal plate including a second hole corresponding to the first hole and a second bead projecting outwardly from the second metal plate to surround the second hole and having a concave formed inside the second bead. The sealing material is disposed in the concave to project outwardly from an outer surface of the second metal plate. The second metal plate is disposed on the first metal plate such that the sealing materials of the first and second metal plates face outwardly of the metal gasket to directly contact the cylinder head and the cylinder block.

DETAILED DESCRIPTION OF PREFERRED EMBODIMENTS

The present invention will be explained with reference to FIGS. 1 and 2. A gasket 1 of the invention is a cylinder head gasket to be installed between a cylinder head and a cylinder block (both not shown) of an internal combustion engine.

Figure 1:
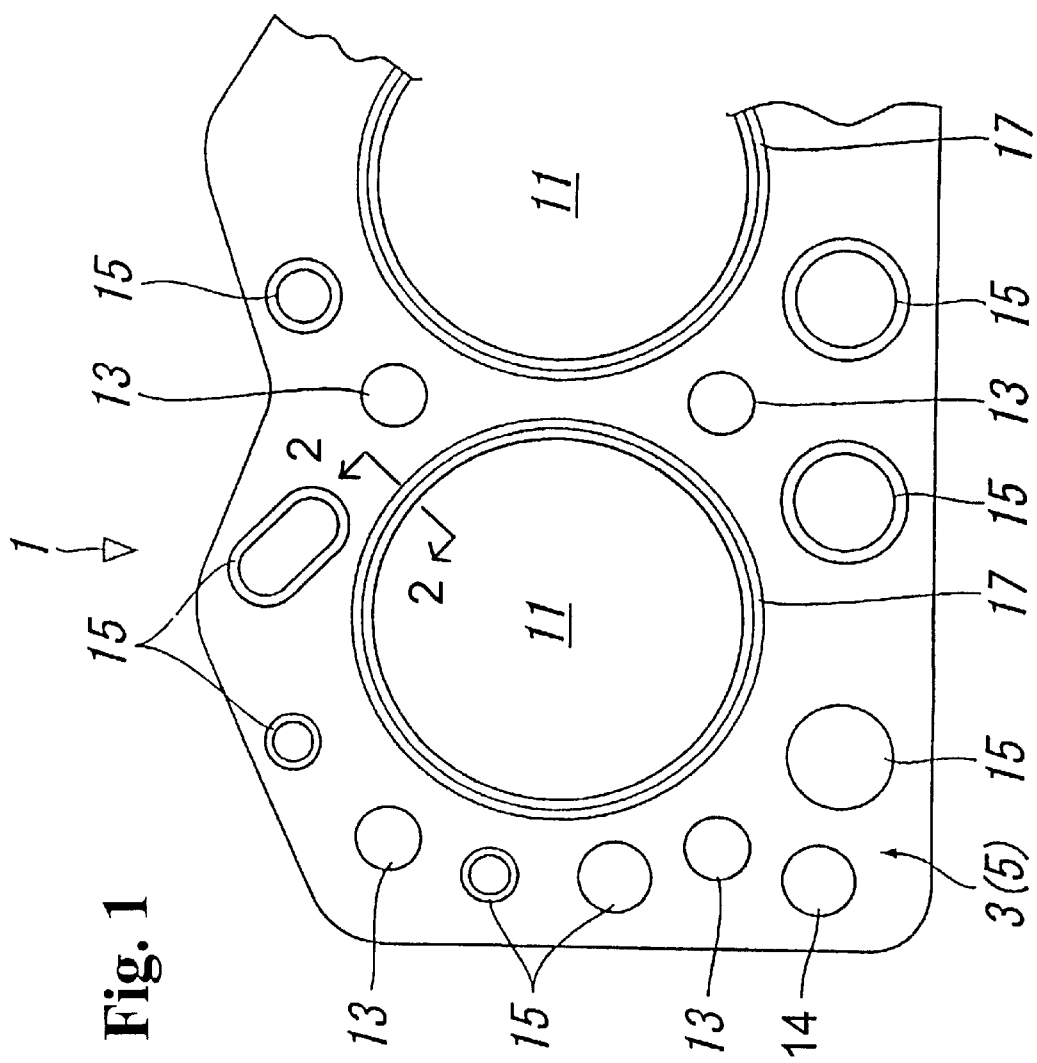
FIG. 1 is a plan view of a part of a cylinder head gasket of the invention.
Figure 2:
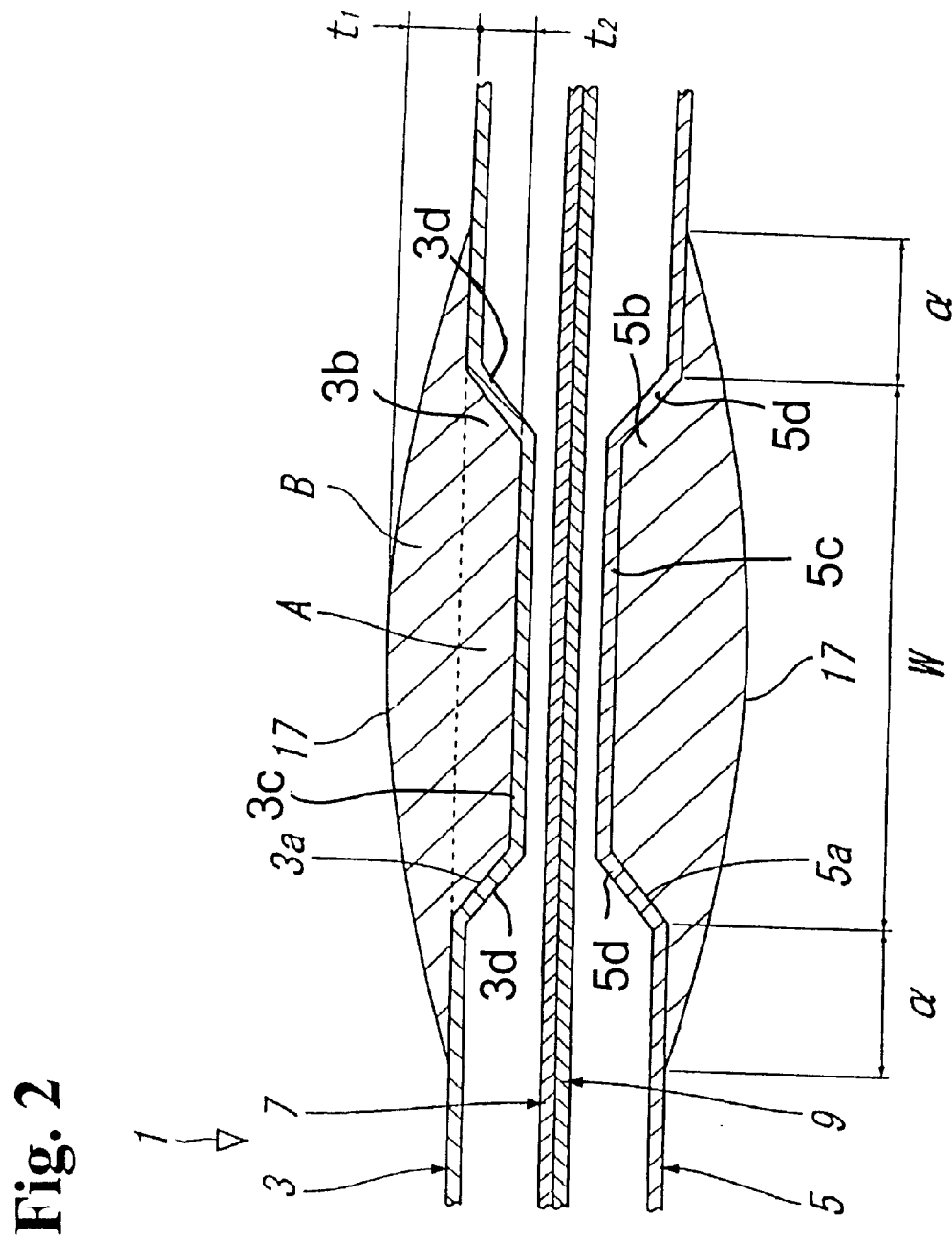
FIG. 2 is an enlarged sectional view taken along line 2—2 in FIG. 1.

As shown in FIGS. 1 and 2, the gasket 1 of the invention comprises outer metal plates 3, 5 for forming outer plates of the gasket, and inner plates 7, 9 disposed inside the outer plates 3, 5. The gasket 1 also includes cylinder bores 11 corresponding to cylinder chambers in the cylinder block, bolt holes 13 disposed around the cylinder bores 11 for securing by bolts, an oil hole 14, and water holes 15.

The outer plates 3, 5 include beads 3a, 5a around the cylinder bores 11 with concave portions 3b, 5b facing outside the gasket, and foamed sealing material or coatings 17 are filled in the concave portions 3b, 5b. Each of the beads 3a, 5a has a trapezoidal shape, and includes a flat bottom portion 3c or 5c, and two side walls 3d, 5d.

As clearly shown in FIG. 2, the sealing materials 17 fill out at least the concave portions 3b, 5b, and are disposed to slightly project outwardly. In particular, in case an amount of the sealing material 17 is a total amount of an amount A deposited in the concave 3b or 5b, and an amount B deposited outside the concave 3b or 5b to project outwardly, a ratio of the amount A to the amount B is A:B=3:1 to 1:1. Also, in case the sealing width of the sealing material is a total width of a bead width W of the bead 3a or 5a and outer widths α on both sides of each bead 3a or 5a, the width α is 0<α≦2 mm. These values are effective experimentally and experimentally.

In the gasket as explained above, the depth $t_2$ of the bead 3a or 5a is preferably 1–3 times of the thickness $t_1$ of the projecting portion on the metal plate 3 or 5. In the invention, the metal plates 3, 5 having the beads 3a, 5a and the sealing materials 17 are arranged symmetrically relative to the plates 7, 9.

In the gasket 1 of the invention, in case a foreign material, such as metal chip, is located outside the bead 3a or 5a, the sealing ability is not lowered. In case the foreign material is located inside the sealing material, and the foreign material extends along the bead 3a or 5a, the foreign material is pushed into the concave portion 3b or 5b when the gasket is tightened. Thus, the foreign material does not affect the sealing ability of the gasket.

On the other hand, in case the foreign material is located inside the sealing material, and the foreign material is located across the bead 3a or 5a, when the gasket is tightened, the foreign material is pushed between the cylinder head and the cylinder block to be flattened and is urged to enter the sealing material 17. Since the foreign material is covered by the sealing material 17, the reduction of the sealing ability due to the foreign material in the gasket is prevented.

As explained above, even if the foreign material is deposited on the bead 3a or 5a between the cylinder head and the cylinder block, the reduction of the sealing ability of the gasket 1 is prevented by the sealing materials 17 deposited in the concave portions 3b, 5b of the bead 3a, 5a. In experiments, in case the above ratio of A:B is set to 3:1, the foreign material of φ500 μm×10 mm can be sealed efficiently.

In the above example, the gasket 1 is formed of four metal plates. However, the invention is not limited thereto, and the gasket can be formed by one or a plurality of metal plates. Namely, the gasket can be formed of one outer plate 3 or 5, two outer plates 3, 5 where the sealing materials 17 are oriented outwardly, and so on. Further, if necessary, a required structure may be added according to the requirement of the engine, such as a shim is included, or grommets are installed around the cylinder bores 11.

Further, the sealing materials 17 may at least fill out the concave portions 3b, 5b and project outwardly beyond the outer surfaces of the metal plates 3, 5. The sealing materials 17 are not required to be coated outside the beads 3a, 5a.

As explained above, in the metal gasket of the invention, since the sealing material is filled in the concave portion of the bead disposed on the outer side of the gasket, even if a foreign material, such as metal chip, is disposed on a bead between a cylinder head and a cylinder block, it is possible to prevent the reduction of the sealing ability of the gasket due to the foreign material sandwiched together with the gasket.

In the invention, the shape of the bead is not limited to the trapezoidal shape, and may be selected as desired, such as a mountain shape. However, it is required to have a concave in the bead to keep the sealing material therein. If the shape of the bead is properly selected, the sealing property and the surface pressure can be determined as desired.

While the invention has been explained with reference to the specific embodiments of the invention, the explanation is illustrative and the invention is limited only by the appended claims.

What is claimed is:

1. A metal gasket for an internal combustion engine with a hole to be sealed, comprising:

a first metal plate extending substantially throughout an entire area to be sealed, said first metal plate including a first hole corresponding to the hole of the engine, and a first bead projecting outwardly from the first metal plate to surround the first hole and having a concave formed inside the first bead, said concave extending inwardly from an outer surface of the first metal plate, a second metal plate including a second hole corresponding to the first hole and a second bead projecting outwardly from the second metal plate to surround the second hole and having a concave formed inside the second bead, said second metal plate being disposed on the first metal plate such that the concaves of the first and second metal plates are piled correspondingly and face outwardly of the metal gasket, and foamed sealing materials disposed in the respective concaves to project outwardly from the outer surfaces of the first and second metal plates, each foamed sealing material including an inside portion disposed in the concave and an outside portion located outside the concave, said outside portion having a length extending over a width of the concave in the width direction of the bead and a height projecting beyond the concave so that even if a foreign material is attached to one of the beads, the foreign material is retained in the foamed sealing material in the bead to substantially prevent an effect of the foreign material to a sealing ability of the bead.

2. A metal gasket according to claim 1, wherein said first bead has a flat portion and two lateral portions extending from the flat portion to form a trapezoid shape in section.

3. A metal gasket according to claim 2, wherein said length extending over the width of the concave is equal to or less than 2 mm.

4. A metal gasket according to claim 3, wherein said sealing material has a ratio in amounts of the inside portion to the outside portion, and ratio being 3:1 to 1:1.

5. A metal gasket according to claim 4, wherein said concave has a depth 1 to 3 times of the height of the outside portion projecting beyond the concave.

* * * * *

UNITED STATES PATENT AND TRADEMARK OFFICE
CERTIFICATE OF CORRECTION

PATENT NO.   : 6,508,474 B2
DATED        : January 21, 2003
INVENTOR(S)  : Yuichi Kinoshita It is certified that error appears in the above-identified patent and that said Letters Patent is hereby corrected as shown below:

<u>Title page,</u>
Item [74], change "kaensaka" to -- Kanesaka --; and

<u>Column 3,</u>
Line 6, change "experimentally" to -- experientially --.

Signed and Sealed this

Twenty-fifth Day of March, 2003

JAMES E. ROGAN
*Director of the United States Patent and Trademark Office*